(12) United States Patent
Chakihara et al.

(10) Patent No.: US 10,538,068 B2
(45) Date of Patent: Jan. 21, 2020

(54) METHOD FOR PRODUCING FUNCTIONAL-SUBSTANCE THIN FILM MATERIAL, FUNCTIONAL-SUBSTANCE THIN FILM MATERIAL, AND LAMINATE THEREOF

(71) Applicant: YASUI SEIKI CO., LTD., Meguro-ku, Tokyo (JP)

(72) Inventors: Takeshi Chakihara, Ebina (JP); Shuichi Iwanaga, Ebina (JP); Hiroshi Mino, Ebina (JP); Hideyuki Yamamoto, Ebina (JP); Yoshinari Yasui, Ebina (JP)

(73) Assignee: YASUI SEIKI CO., LTD., Tokyo (JP)

( * ) Notice: Subject to any disclaimer, the term of this patent is extended or adjusted under 35 U.S.C. 154(b) by 64 days.

(21) Appl. No.: 15/523,262

(22) PCT Filed: Feb. 5, 2015

(86) PCT No.: PCT/JP2015/053199
§ 371 (c)(1),
(2) Date: Apr. 28, 2017

(87) PCT Pub. No.: WO2016/067641
PCT Pub. Date: May 6, 2016

(65) Prior Publication Data
US 2017/0313038 A1    Nov. 2, 2017

(30) Foreign Application Priority Data

Oct. 31, 2014   (JP) .................................. 2014-222564

(51) Int. Cl.
*B29C 65/00* (2006.01)
*B32B 27/08* (2006.01)
(Continued)

(52) U.S. Cl.
CPC .............. *B32B 27/08* (2013.01); *B29C 55/12* (2013.01); *B29C 65/4805* (2013.01);
(Continued)

(58) Field of Classification Search
CPC . B29C 65/48; B29C 65/4805; B29C 65/4855; B29C 66/41; B29C 66/47;
(Continued)

(56) References Cited

U.S. PATENT DOCUMENTS

2003/0066600 A1* 4/2003 Kauffman ................. B32B 7/12
156/274.4
2004/0043238 A1* 3/2004 Wuest ...................... B32B 27/16
428/515
(Continued)

FOREIGN PATENT DOCUMENTS

JP        361130043 A    6/1986
JP        2002067241 A   3/2002
(Continued)

OTHER PUBLICATIONS

International Search Report (ISR), dated May 19, 2015, issued for International application No. PCT/JP2015/053199.
(Continued)

*Primary Examiner* — Mark A Osele
*Assistant Examiner* — Nickolas R Harm
(74) *Attorney, Agent, or Firm* — Law Office of Katsuhiro Arai

(57) ABSTRACT

In an embodiment, a process for producing a functional-substance thin film material for which a required heating temperature for finishing is 100-130° C. is characterized in that a PP film 2 is releasably laminated to a surface of a PET film 1 with a non-silicone adhesive layer 3 so that the strength of adhesion of the PP film 2 by the non-silicone adhesive layer 3 is regulated so as to prevent the PP film 2
(Continued)

from suffering thermal deformation when a functional substance superposed in a thin film form on the other surface of the PP film 2 is heated to 100-130° C. in order to finally convert the functional substance into a functional-substance thin film material 4.

8 Claims, 1 Drawing Sheet

(51) Int. Cl.
| | | |
|---|---|---|
| *B32B 27/32* | (2006.01) | |
| *B32B 27/36* | (2006.01) | |
| *B29C 55/12* | (2006.01) | |
| *B29C 65/48* | (2006.01) | |
| *B32B 37/12* | (2006.01) | |
| *B32B 37/20* | (2006.01) | |
| *B32B 37/26* | (2006.01) | |
| *B29K 23/00* | (2006.01) | |
| *B29K 67/00* | (2006.01) | |
| *B29K 105/00* | (2006.01) | |
| *B29L 7/00* | (2006.01) | |
| *B29L 9/00* | (2006.01) | |

(52) U.S. Cl.
CPC .............. *B32B 27/32* (2013.01); *B32B 27/36* (2013.01); *B32B 37/12* (2013.01); *B32B 37/206* (2013.01); *B32B 37/26* (2013.01); *B29C 65/48* (2013.01); *B29C 65/4855* (2013.01); *B29C 66/343* (2013.01); *B29C 66/41* (2013.01); *B29C 66/47* (2013.01); *B29C 66/7311* (2013.01); *B29K 2023/12* (2013.01); *B29K 2067/003* (2013.01); *B29K 2105/256* (2013.01); *B29L 2007/008* (2013.01); *B29L 2009/00* (2013.01); *B32B 2037/268* (2013.01); *B32B 2250/03* (2013.01); *B32B 2323/10* (2013.01); *B32B 2367/00* (2013.01)

(58) Field of Classification Search
CPC .............. B29C 66/343; B29C 66/7311; B29C 66/1702; Y10T 156/1095
USPC ...................... 156/60, 244.16, 247, 277, 289
See application file for complete search history.

(56) References Cited

U.S. PATENT DOCUMENTS

| | | | |
|---|---|---|---|
| 2004/0092399 A1* | 5/2004 | Bourdelais | B32B 27/32 503/227 |
| 2007/0292650 A1 | 12/2007 | Suzuki | |
| 2009/0221408 A1* | 9/2009 | Cope | B29C 66/83413 493/212 |
| 2011/0143104 A1* | 6/2011 | Koike | B32B 7/06 428/195.1 |
| 2012/0094064 A1* | 4/2012 | Sato | G09F 3/10 428/136 |
| 2012/0145304 A1* | 6/2012 | Mitchell | B32B 27/08 156/60 |
| 2013/0028540 A1* | 1/2013 | Matsumoto | C08G 59/4014 383/107 |
| 2013/0118925 A1* | 5/2013 | Marumo | B32B 27/18 206/213.1 |
| 2013/0196215 A1* | 8/2013 | Karatsu | H01M 2/0287 429/176 |
| 2014/0295181 A1* | 10/2014 | Minomo | C09D 175/06 428/354 |
| 2017/0087814 A1* | 3/2017 | Goel | B32B 37/02 |
| 2017/0113437 A1* | 4/2017 | Shimoguchi | B32B 27/00 |

FOREIGN PATENT DOCUMENTS

| | | |
|---|---|---|
| JP | 2008050393 A | 3/2008 |
| JP | 2008087421 A | 4/2008 |
| JP | 2010116532 A | 5/2010 |
| JP | 2010234570 A | 10/2010 |
| JP | 2011068822 A | 4/2011 |
| JP | 2011143586 A | 7/2011 |
| JP | 2011173391 A | 9/2011 |
| JP | 2013126741 A | 6/2013 |
| JP | 2014100917 A | 6/2014 |
| WO | 2005100499 A1 | 10/2005 |

OTHER PUBLICATIONS

Extended European Search Report (EESR) dated Apr. 5, 2018, issued for European counterpart patent application No. EP15853718.3.

* cited by examiner

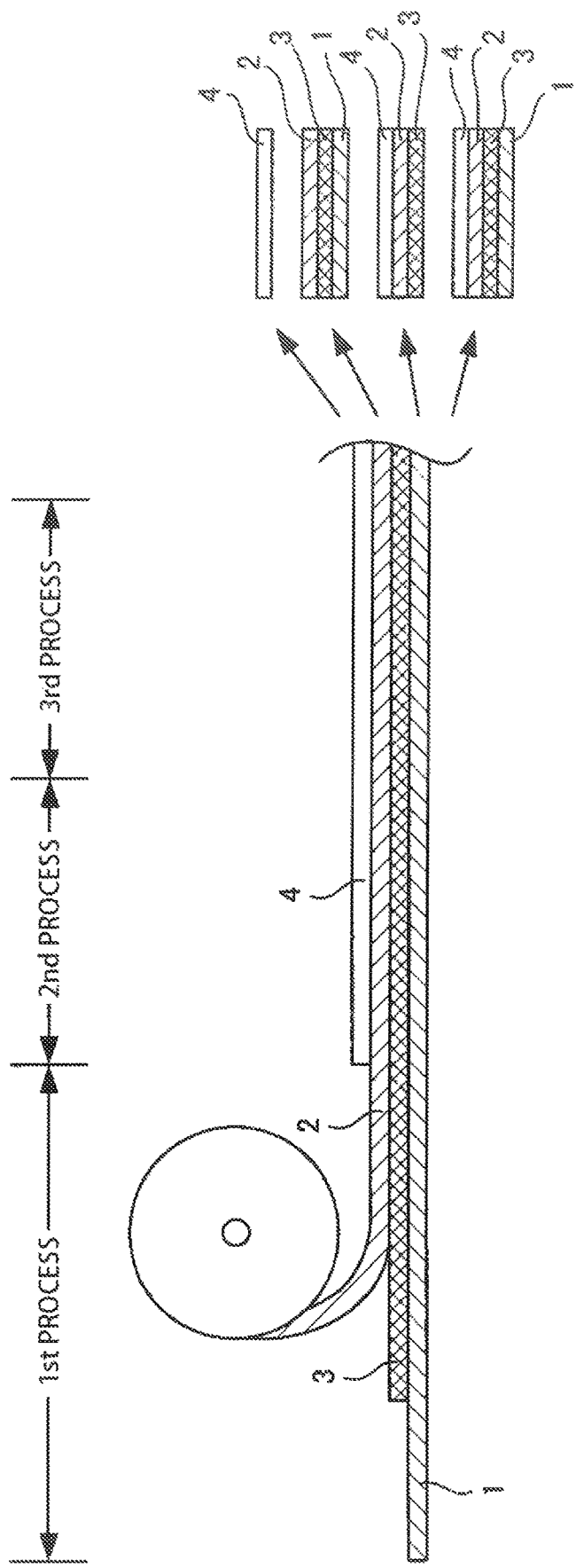

METHOD FOR PRODUCING FUNCTIONAL-SUBSTANCE THIN FILM MATERIAL, FUNCTIONAL-SUBSTANCE THIN FILM MATERIAL, AND LAMINATE THEREOF

This application is the U.S. National Phase under 35 U.S.C. § 371 of International Application PCT/JP2015/053199, filed Feb. 5, 2015, which claims priority to Japanese Patent Application No. 2014-222564, filed Oct. 31, 2014. The International Application was published under PCT Article 21(2) in a language other than English.

TECHNICAL FIELD

The present invention relates to a method for producing a functional-substance thin film material, a functional-substance thin film material, and a laminate thereof. In particular, the present invention relates to a method for producing a functional-substance thin film material that is suitable for production in which a polypropylene (PP) film is used, a functional-substance thin film material, and a laminate thereof.

BACKGROUND ART

In recent years, functional-substance thin film materials in which a functional substance is formed into a thin film have become widely used in all fields, such as for general consumer use, for industrial use, for medical use, and for use in outer space.

In production of such functional-substance thin film materials, the functional-substance thin film material is laminated onto a surface of a PP film, which has excellent mechanical characteristics, thermal characteristics, release characteristics, and the like. Furthermore, like the functional-substance thin film material, the PP film is also used in all fields, such as for general consumer use, for industrial use, for medical use, and for use in outer space, due to the excellent characteristics thereof. The functional-substance thin film material is used separately from the PP film or in the form of a laminate with the PP film (refer to Patent Literatures 1 to 4).

Patent Literature 1: Japanese Patent Laid-open Publication No. 2008-087421
Patent Literature 2: Japanese Patent Laid-open Publication No. 2010-234570
Patent Literature 3: Japanese Patent Laid-open Publication No. 2011-143586
Patent Literature 4: Japanese Patent Laid-open Publication No. 2014-100917

DISCLOSURE OF INVENTION

Problem to be Solved by the Invention

Conventionally, in production of the functional-substance thin film material, the functional-substance thin film material is laminated onto a surface of a PP film in a thin film form. Subsequently, the functional-substance thin film material and the PP film that are in a laminate form are heated at a predetermined temperature and subjected to a finishing process.

However, the PP film softens when heated to 100° C. or higher. As a result, for example, when tensile force is applied in a conveyance direction of the PP film, longitudinal creases are formed. A problem occurs in that both the functional-substance thin film material and the PP film that are in a laminate form become defective products having longitudinal creases.

The present invention has been achieved in light of such issues. An object of the present invention is to provide a method for producing a functional-substance thin film material of which a heating temperature for finishing is high, at 100° C. to 130° C., the method being capable of producing a functional-substance thin film material that has an even thickness and is flat, and to also provide a functional-substance thin film material and a laminate thereof.

Means for Solving Problem

Through keen research, the inventors and the like of the present invention have completed the present invention by discovering that a functional-substance thin film material and a laminate thereof can be produced by setting a strength of adhesion by a non-silicone adhesive layer of a PP film releasably laminated onto a surface of a polyethylene terephthalate (PET) film, with the non-silicone adhesive layer therebetween, to a strength at which thermal deformation does not occur in the PP film even during heating to a heating temperature of 100° C. to 130° C. for finishing a functional substance that is in a thin film form and laminated onto the other surface of the PP film to form the functional-substance thin film material.

To achieve the above-described object, a first aspect of the method for producing a functional-substance thin film material of the present invention is a method for producing a functional-substance thin film material in which a functional-substance thin film material is formed by a functional substance being laminated in a thin film form onto a surface of a PP film on which a non-silicone adhesive layer is not laminated, the PP film being releasably laminated onto a surface of a PET film with the non-silicone adhesive layer therebetween, and a finishing treatment is subsequently performed on the functional substance in the thin film form by heating within a temperature range of 100° C. to 130° C. The method for producing a functional-substance thin film material is characterized in that a functional-substance thin film material that has an even thickness and is flat is formed such that a strength of adhesion by the non-silicone adhesive layer is set in advance to a strength at which thermal deformation does not occur in the PP film during heating to a heating temperature of 100° C. to 130° C. for finishing the functional substance that is in the thin film form and laminated onto the PP film to form the functional substance thin film material.

In addition, a second aspect of the method for producing a functional-substance thin film material of the present invention is characterized in that the functional-substance thin film material is laminated onto the PP film in a fixed or releasable manner.

Furthermore, a third aspect of the method for producing a functional-substance thin film material of the present invention is characterized in that the PP film is formed by a homopolymer being biaxially stretched by an inflation method.

In addition, a fourth aspect of the method for producing a functional-substance thin film material of the present invention is characterized in that lamination of the PP film onto the PET film is performed by a wet lamination method or a dry lamination method.

Furthermore, a fifth aspect of the method for producing a functional-substance thin film material of the present invention is characterized in that a UV ink is used as the non-silicone adhesive layer in the dry lamination method.

In addition, a first aspect of a functional-substance thin film material and a laminate thereof of the present invention is characterized in that the functional-substance thin film material and the laminate thereof are produced by a method of production described according to any of the above-described first to fifth aspects of the method for producing a functional-substance thin film material of the present invention.

Effect of the Invention

As a result of a functional-substance thin film material being produced based on a method for producing a functional-substance thin film material of the present invention, an excellent effect can be achieved in that a functional-substance thin film material and a laminate thereof that have an even thickness and are flat can be obtained regarding a functional-substance thin film material of which a heating temperature for finishing is high, at 100° C. to 130° C.

BRIEF DESCRIPTION OF DRAWINGS

FIG. 1 is a process diagram showing an embodiment of a functional-substance thin film material and a laminate thereof of the present invention.

EXPLANATIONS OF LETTERS OR NUMERALS

1 PET film
2 PP film
3 non-silicone adhesive layer
4 functional-substance thin film material

BEST MODE(S) FOR CARRYING OUT THE INVENTION

An embodiment of a method for producing a functional-substance thin film material, a functional-substance thin film material, and a laminate thereof of the present invention will hereinafter be described with reference to FIG. 1.

FIG. 1 shows a first embodiment of the method for producing a functional-substance thin film material, the functional-substance thin film material, and the laminate thereof of the present invention.

In FIG. 1, the production process progresses from left to right.

In the method for producing a functional-substance thin film material according to the present embodiment, a first process for laminating a PET film and a PP film, a second process for laminating a functional substance onto the PP film, and a third process for finishing the functional substance are performed in sequence.

Each process and the like will be further described below.
<First Process for Laminating a PET Film and a PP Film>
A PET film 1 and a PP film 2, which are both in a thin film form, are releasably laminated by a wet lamination method or a dry lamination method, with a non-silicone adhesive layer 3 therebetween.

As the PET film 1, a publicly known material having a thickness of about 25 μm to 100 μm may be used.

As the PP film 2, a publicly known material having a thickness of about 25 μm to 100 μm may be used. In particular, a PP film formed by a PP homopolymer being biaxially stretched by an inflation method is suitable for maintaining flatness with an even thickness. In addition, a surface of the PP film 2 that is laminated onto the non-silicone adhesive layer 3 may be subjected to a publicly known modification treatment, such as corona treatment, ultraviolet irradiation, or electron beam (EB) irradiation, as required. Furthermore, regarding the roughness of the surface of the PP film 2, a smooth state, a matte state, or the like may be selected depending on the characteristics of a functional-substance thin film material 4 and a laminate thereof to be produced.

As the adhesive material forming the non-silicone adhesive layer 3, a publicly known adhesive material can be used. The adhesive material includes, for example, acrylic-based pressure-sensitive adhesives, urethane-based pressure-sensitive adhesives, and ultraviolet (UV) curing resin-based adhesives.

As the wet lamination method, a publicly known method can be used.

Specifically, the PET film 1 is thinly coated with the non-silicone adhesive material. Subsequently, the PP film 2 is laminated onto the wet non-silicone adhesive layer 3. Then, the non-silicone adhesive layer 3 is dried. The PET film 1 and the PP film 2 are thereby releasably laminated by the wet lamination method, with the non-silicone adhesive layer 3 therebetween. As the method for applying the non-silicone adhesive material, the non-silicone adhesive material may be applied in a thin film form by a micro-gravure method using a micro-gravure roll, a slot die method using a slot die, a knife edge method using a knife edge, or the like. In addition, in this case, as the non-silicone adhesive, a UV ink to which a solvent is not added at all may be used. When the UV ink is used, the non-silicone adhesive layer 3 may be formed by the UV ink being hardened by being irradiated with UV during the drying process. In the process for drying the non-silicone adhesive layer 3, should an annealing treatment for gradually cooling the PET film 1, the non-silicone adhesive layer 3, and the PP film 3 in the laminated state be performed, the treatment is suitable for maintaining flatness with an even thickness of the PP film 2 in the third process for finishing the functional substance.

As the dry lamination method, a publicly known method can be used.

Specifically, the PET film 1 is thinly coated with the non-silicone adhesive material and subsequently dried. The PP film 2 is laminated onto the dry non-silicone adhesive layer 3 of the PET film 1 on which the non-silicone adhesive layer 3 has been laminated in advance. The PET film 1 and the PP film 2 are thereby releasably laminated by the dry lamination method, with the non-silicone adhesive layer 3 therebetween.

The strength of adhesion by the non-silicone adhesive layer 3 of the PET film 1 and the PP film 2 laminated in this way is set in advance to a strength at which thermal deformation does not occur in the PP film 2 during heating to a heating temperature of 100° C. to 130° C. for finishing the functional substance that is in the thin film form and laminated onto the PP film 2 to form the functional-substance thin film material 4, during the third process for finishing the functional substance. A flat functional-substance thin film material 4 is thereby formed. The strength of adhesion may be 0.05 N/25 mm to 10 N/25 mm. When the strength of adhesion is less than 0.05 N/25 mm, the PET film 1 and the PP film 2 cannot be kept flat during the heating process. When the strength of adhesion is greater than 10 N/25 mm, deformation occurs in the PET film 1 and the PP film 2 when the PET film 1 and the PP film 2 are released.

<Second Process for Laminating a Functional Substance onto the PP Film>

The second process for laminating the functional substance onto the PP film may be performed upon whether to perform the second process continuously after the first process for laminating the PET film and the PP film or to perform the second process in a non-continuous manner being selected.

In the second process for laminating the functional substance onto the PP film, the functional substance is laminated in a thin film form onto the surface of the PP film 2 on which the non-silicone adhesive layer 3 is not laminated, the PP film 2 being releasably laminated onto the surface of the PET film 1 with the non-silicone adhesive layer 3 therebetween. The lamination of the functional substance may be performed by a functional substance in a melted state being applied to the surface of the PP film 2 by a publicly known coating method. The functional substance may be applied in a thin film form by the micro-gravure method using a micro-gravure roll, the slot die method using a slot die, the knife edge method using a knife edge, or the like. In addition, the functional substance may be applied by spray coating, vapor deposition, or the like, as required. As the functional substance to be used in this case, any material is possible as long as the material can be applied in a melted state and the heating temperature for finishing is 100° C. to 130° C. For example, the material may be elastic materials such as rubber, resin materials used for various purposes, or dispersion slurries of inorganic powder. The elastic materials include, for example, a rubber-based adhesive. The resin materials include, for example, epoxy resin and silicone resin. The coating thickness of the functional substance may be adjusted based on the thickness after the finishing process.

<Third Process for Finishing the Functional Substance>

In the process for finishing the functional substance, a finishing treatment for forming the functional-substance thin film material 4 in a thin film form is performed by the functional substance laminated onto the surface of the continuously conveyed PP film 2 on which the non-silicone adhesive layer 3 is not laminated being heated within a temperature range of 100° C. to 130° C. Finishing conditions, such as the heating temperature, conveyance speed, length of heating in conveyance direction, and the like of the finishing treatment may be adjusted based on the characteristics of the functional-substance thin film material 4 to be completed. In addition, the functional-substance thin film material 4 that is produced upon completion of the third process is laminated onto the PP film 2 in a releasable or fixed manner, depending on the compatibility between the functional-substance thin film material and the PP film 2.

When the third process is completed, first, a laminate composed of the functional-substance thin film material 4, the PP film 2, and the PET film 1 is produced. Second, when the functional-substance thin film material 4 is released from the PP film 2 of the first laminate, the functional-substance thin film material 4 alone and a laminate of the PET film 1, the non-silicone adhesive 3, and the PP film 2 are produced. Third, when the PET film 1 is released from the PP film 2 of the first laminate, a laminate composed of the functional-substance thin film material 4, the PP film 2, and the non-silicone adhesive 3 is produced.

<Functional-Substance Thin Film Material and a Laminate Thereof>

According to the present embodiment, the strength of adhesion of the non-silicone adhesive layer 3 is set in advance to a strength at which thermal deformation does not occur in the PP film 2 during heating to a heating temperature of 100° C. to 130° C. for finishing the functional substance that is in the thin film form and laminated onto the PP film 2 to form the functional-substance thin film material 4. Therefore, the PP film 2 can maintain flatness and an even thickness continuously until completion of the third process for finishing. As a result of the property of the PP film 2, the functional-substance thin film material 4 and the laminate thereof that have an even thickness and are flat can be obtained.

EXAMPLE

<Laminate of a PET Film, a Non-Silicone Adhesive Layer and a PP Film>

As the PET film, a PET film manufactured by Toray Industries, Inc. (T60; thickness: 50 μm) was used.

As the PP film, a PP film manufactured by MIRWEC FILM. INC. (USA) (BOPLON [registered trademark] FILM; thickness: 20 μm) was used.

The following two lamination methods were used as the lamination method for both films.

In the wet lamination method, the PET film 1 was coated with a UV-curing pressure-sensitive adhesive by the slot die method such that a dried thickness is 50 μm. Subsequently, the PET film 1 and the PP film 2 were laminated. The resultant was then irradiated with UV for 1 minute, thereby hardening the UV-curing pressure-sensitive adhesive.

In the dry lamination method, the PET film 1 was coated with an acrylic-based pressure-sensitive adhesive by the slot die method such that a dried thickness is 20 μm. Subsequently, the resultant was dried for 1 minute at 100° C., thereby forming an acrylic-based pressure-sensitive adhesive layer on the PET film 1. The PP film 2 was then dry-laminated onto the acrylic-based pressure-sensitive adhesive layer.

<Functional-Substance Thin Film Material and a Laminate Thereof>

Example 1: An Example in which an Elastic Member is Used as the Functional Substance A nitrile rubber adhesive was used as the elastic member.

Method for producing the functional-substance thin film material:

The surface of the PP film 2 was coated with the nitrile rubber adhesive by the slot die method such that the dried thickness is 35 μm. Subsequently, the resultant was dried for 2 minutes at 100° C., 110° C., 120° C., and 30° C., thereby hardening four types of nitrile rubber adhesives.

Functions of the functional-substance thin film material:

The thin film layers of the four types of nitrile rubber adhesives produced in this manner are releaseable from the PP film 2, and maintain an even thickness and flatness.

The thin film layer of nitrile rubber adhesive provides the following functions:

First, a nitrile rubber adhesive used as an adhesive for automobile parts can be processed into a thin-film sheet that has an even thickness and is flat.

Second, a thin film layer of nitrile rubber adhesive releasably formed on the surface of a silicone release film that has already been realized has a problem in that the strength of adhesion decreases as a result of transfer of silicone onto the adhesion surface. However, as a result of the thin film layer of nitrile rubber adhesive being fabricated onto the surface of the PP film 2 serving as the non-silicone release film in the present example, the thin film layer of nitrile rubber adhesive can maintain stable strength.

Third, the nitrile rubber adhesive contains an organic solvent such as toluene and is therefore required to be dried at a temperature raised to 100° C. or higher. A typical PP film softens when heated to 100° C., and a problem occurs in that an even thickness and flatness cannot be maintained. However, the PP film 2 in the present example can maintain an even thickness and flatness even when heated to 100° C. to 130° C. Therefore, an even thickness and flatness of the thin film layer of nitrile rubber adhesive can be maintained.

Example 2: An Example in which a Resin Member is Used as the Functional Substance A silicone resin was used as the resin member.

Method for producing the functional-substance thin film material:

The surface of the PP film 2 was coated with the silicone resin by the slot die method such that the dried thickness is 100 μm to 120 μm. Subsequently, the resultant was dried for 2 minutes at 100° C., 110° C., 120° C., and 30° C., thereby hardening the silicone resin.

Functions of the functional-substance thin film material:

The thin film layers of silicone resin produced in this manner are releaseable from the PP film 2, and maintain an even thickness and flatness.

The thin film layer of silicone resin provides the following functions:

First, a thin film layer of silicone resin can be used as a re-releasable pressure-sensitive adhesive and can also be used as a cushioning material.

Second, the silicone resin is the same material as that of the surface of a silicone release films that has already been realized. Therefore, the silicon resin cannot be releasably formed. However, the thin film layer of silicone resin can be releasably fabricated onto the surface of the PP film 2 serving as the non-silicone release film in the present example.

Third, heat treatment at a temperature of 100° C. to 130° C. is required to promote hardening of the silicone resin. A typical PP film softens when heated to 100° C., and a problem occurs in that an even thickness and flatness cannot be maintained. However, the PP film 2 in the present example can maintain an even thickness and flatness even when heated to 100° C. to 130° C. Therefore, production in which the even thickness and flatness of the thin film layer of silicone resin is maintained can be performed.

The present invention is not limited to the above-described embodiment and examples, and can be modified as required.

The invention claimed is:

1. A method for producing a functional-substance thin film material in which a functional-substance thin film material is formed by a functional substance being laminated in a thin film form onto a surface of a polypropylene film on which a non-silicone adhesive layer is not laminated, the polypropylene film being releasably laminated onto a surface of a polyethylene terephthalate film with a non-silicone adhesive layer therebetween, and a finishing treatment is subsequently performed on the functional substance in the thin film form by heating within a temperature range of 100° C. to 130° C., the method characterized in that:

a UV-curing pressure-sensitive adhesive constitutes the non-silicone adhesive layer, and the polypropylene film is laminated onto the polyethylene terephthalate by a wet lamination method using the UV-curing pressure-sensitive adhesive, and a flat functional-substance thin film material is formed wherein a strength of adhesion by the non-silicone adhesive layer is set in advance to a strength at which thermal deformation does not occur in the polypropylene film during heating to a heating temperature of 100° C. to 130° C. as the finishing treatment for finishing the functional substance that is in the thin film form and laminated onto the polypropylene film to form the functional substance thin film material, followed by the finishing treatment.

2. The method for producing a functional-substance thin film material according to claim 1, characterized in that:

the functional-substance thin film material is laminated onto the polypropylene film in a fixed or releasable manner.

3. The method for producing a functional-substance thin film material according to claim 2, characterized in that:

the polypropylene film is formed by a homopolymer being biaxially stretched by an inflation method.

4. The method for producing a functional-substance thin film material according to claim 1, characterized in that:

the polypropylene film is formed by a homopolymer being biaxially stretched by an inflation method.

5. A method for producing a functional-substance thin film material in which a functional-substance thin film material is formed by a functional substance being laminated in a thin film form onto a surface of a polypropylene film on which a non-silicone adhesive layer is not laminated, the polypropylene film being releasably laminated onto a surface of a polyethylene terephthalate film with the non-silicone adhesive layer therebetween, and a finishing treatment is subsequently performed on the functional substance in the thin film form by heating within a temperature range of 100° C. to 130° C., the method characterized in that:

an acrylic-based pressure-sensitive adhesive constitutes the non-silicone adhesive layer, and the polypropylene film is laminated onto the polyethylene terephthalate film by a dry lamination method using the acrylic-based pressure-sensitive adhesive, and a flat functional-substance thin film material is formed wherein a strength of adhesion by the non-silicone adhesive layer is set in advance to a strength at which thermal deformation does not occur in the polypropylene film during heating to a heating temperature of 100° C. to 130° C. for finishing the functional substance that is in the thin film form and laminated onto the polypropylene film to form the functional substance thin film material, followed by the finishing treatment, wherein the strength of adhesion of the non-silicone layer is between 0.05 N/25 mm and 10 N/25 mm.

6. The method for producing a functional-substance thin film material according to claim 5, characterized in that:

the functional-substance thin film material is laminated onto the polypropylene film in a fixed or releasable manner.

7. The method for producing a functional-substance thin film material according to claim 6, characterized in that:

the polypropylene film is formed by a homopolymer being biaxially stretched by an inflation method.

8. The method for producing a functional-substance thin film material according to claim 5, characterized in that:
   the polypropylene film is formed by a homopolymer being biaxially stretched by an inflation method.

* * * * *